United States Patent [19]

Oswald et al.

[11] 4,272,221

[45] * Jun. 9, 1981

[54] UNDERCARRIAGE FOR ADVERSE TERRAIN VEHICLES

[75] Inventors: Norman D. Oswald, Duncanville; Harry S. Mankey, Dallas, both of Tex.

[73] Assignee: Standard Manufacturing Company, Incorporated, Dallas, Tex.

[*] Notice: The portion of the term of this patent subsequent to Jul. 1, 1997, has been disclaimed.

[21] Appl. No.: 10,084

[22] Filed: Feb. 6, 1979

Related U.S. Application Data

[63] Continuation-in-part of Ser. No. 835,726, Sep. 22, 1977, abandoned, which is a continuation-in-part of Ser. No. 799,328, May 23, 1977, abandoned.

[51] Int. Cl.³ .............................................. B62D 11/02
[52] U.S. Cl. ................................. 414/634; 180/6.48; 180/24.12
[58] Field of Search ................. 180/6.2, 21, 22, 24.01, 180/24.11, 24.12, 54 R, 6.48; 280/81 R; 414/634

[56] References Cited

U.S. PATENT DOCUMENTS

| | | | |
|---|---|---|---|
| 1,197,526 | 9/1916 | Mesecke | 180/22 X |
| 2,421,123 | 5/1947 | Jensen | 280/47.12 |
| 2,642,144 | 6/1953 | Brewer, Jr. | 74/242.1 R X |
| 3,166,141 | 1/1965 | Shields et al. | 180/22 X |
| 3,168,927 | 2/1965 | Garner | 180/22 X |
| 3,376,990 | 4/1968 | Latall | 414/634 |
| 3,385,255 | 5/1968 | Raymond et al. | 115/1 |
| 3,444,837 | 5/1969 | Donofrio | 180/22 X |
| 3,451,574 | 6/1969 | Weichel | 414/502 |
| 3,520,378 | 7/1970 | Slay | 180/21 |
| 3,572,454 | 3/1971 | Siren | 180/6.2 |
| 3,592,280 | 7/1971 | Wappler et al. | 180/6.2 |
| 3,727,774 | 4/1973 | Wolfe, Jr. | 180/306 X |
| 3,747,718 | 7/1973 | Gauchet | 180/9.2 R |
| 3,771,615 | 11/1973 | Rieli | 180/6.48 |
| 3,799,362 | 3/1974 | Oswald et al. | 214/1 D |
| 4,009,761 | 3/1977 | Meyer | 180/6.2 |

FOREIGN PATENT DOCUMENTS

| | | |
|---|---|---|
| 887800 | 1/1962 | United Kingdom . |
| 895876 | 5/1962 | United Kingdom . |

Primary Examiner—John J. Love
Assistant Examiner—Michael Mar
Attorney, Agent, or Firm—Richards, Harris & Medlock

[57] ABSTRACT

A detachable undercarriage for use on adverse terrain vehicles comprising an elongate hollow load-bearing frame having three or four axles rotatably supported thereon. Sprockets are mounted on at least two of the axles, and chains are constrained around the sprockets to drivingly interconnect the axles. The center axle in the three axle embodiment and the center two axles in the four axle embodiment are positioned below a plane extending through the axes of rotation of the outermost two axles to facilitate skid steering of vehicles incorporating the undercarriage. Alternatively, all the axles can be aligned with larger wheels mounted on the center axle in the three axle embodiment or the center two axles in the four axle embodiment to facilitate skid steering. In certain applications of the nonaligned axle embodiments structure is provided for selectively aligning all the axles to increase vehicle stability. Also included in the undercarriage is a drive assembly having a motor connected to a transmission mounted inboard or outboard of the frame. In one configuration, an endmost axle is chain driven from the transmission, with the middle axle being chain driven from the endmost axle. In an alternate configuration, an endmost axle and the middle axle are directly chain driven from the transmission.

7 Claims, 27 Drawing Figures

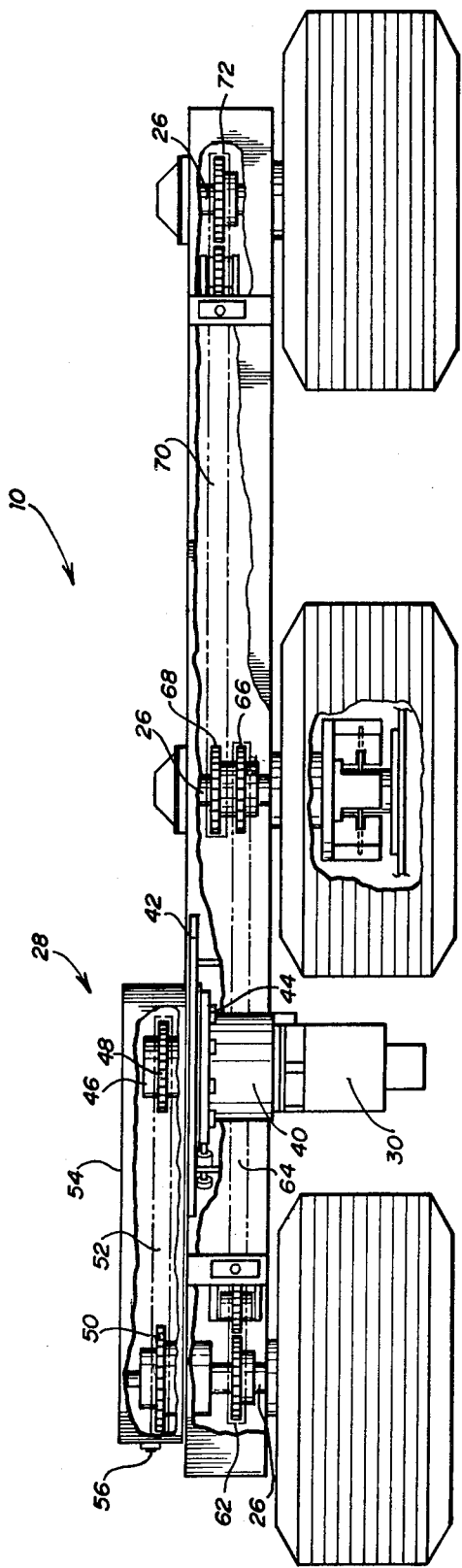
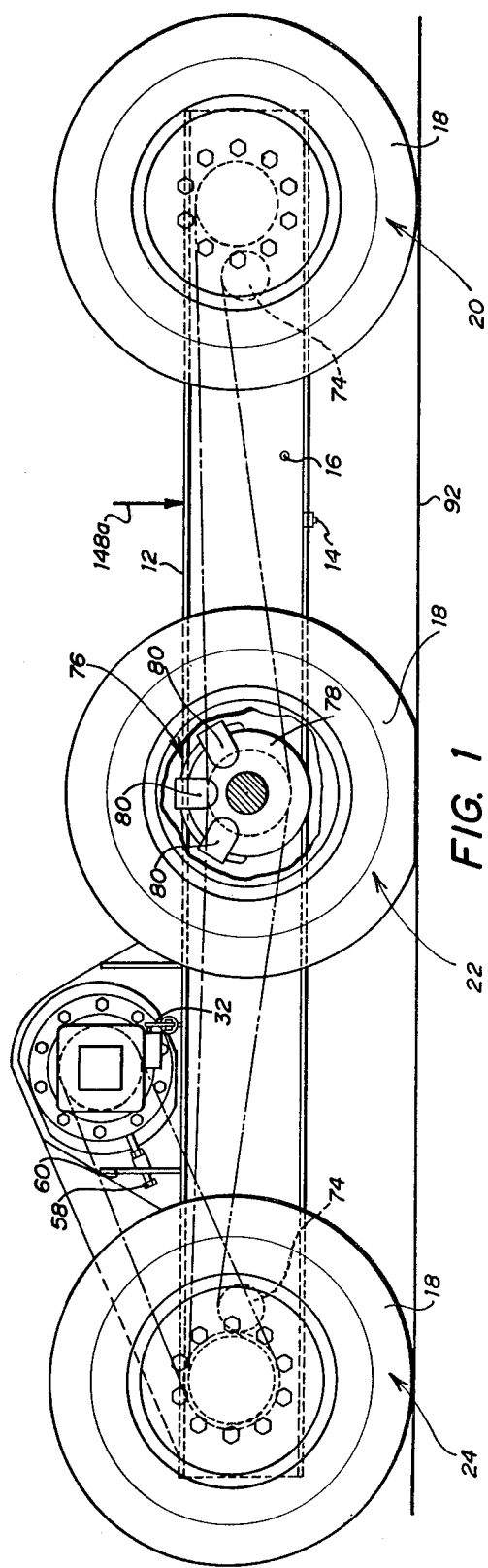

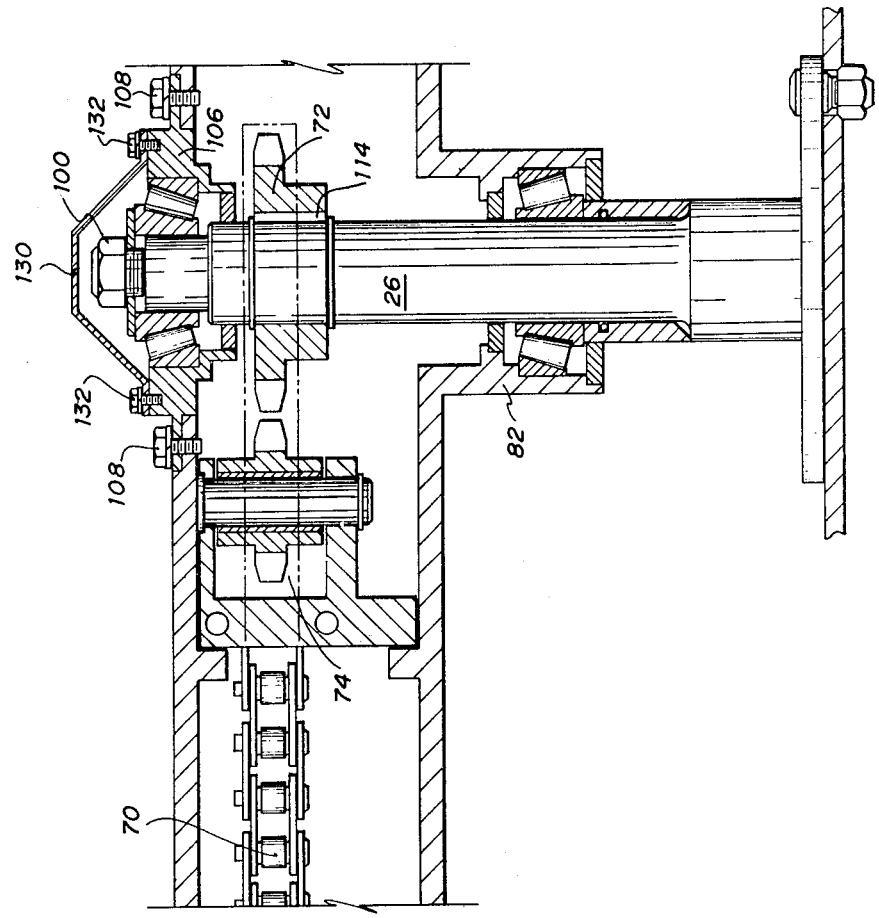
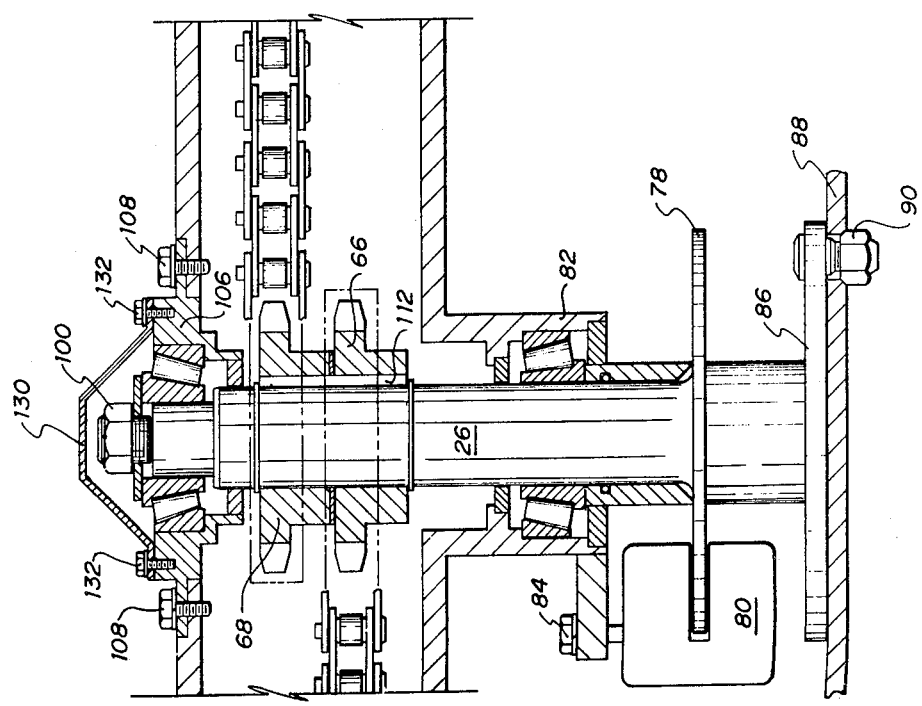
FIG. 3b

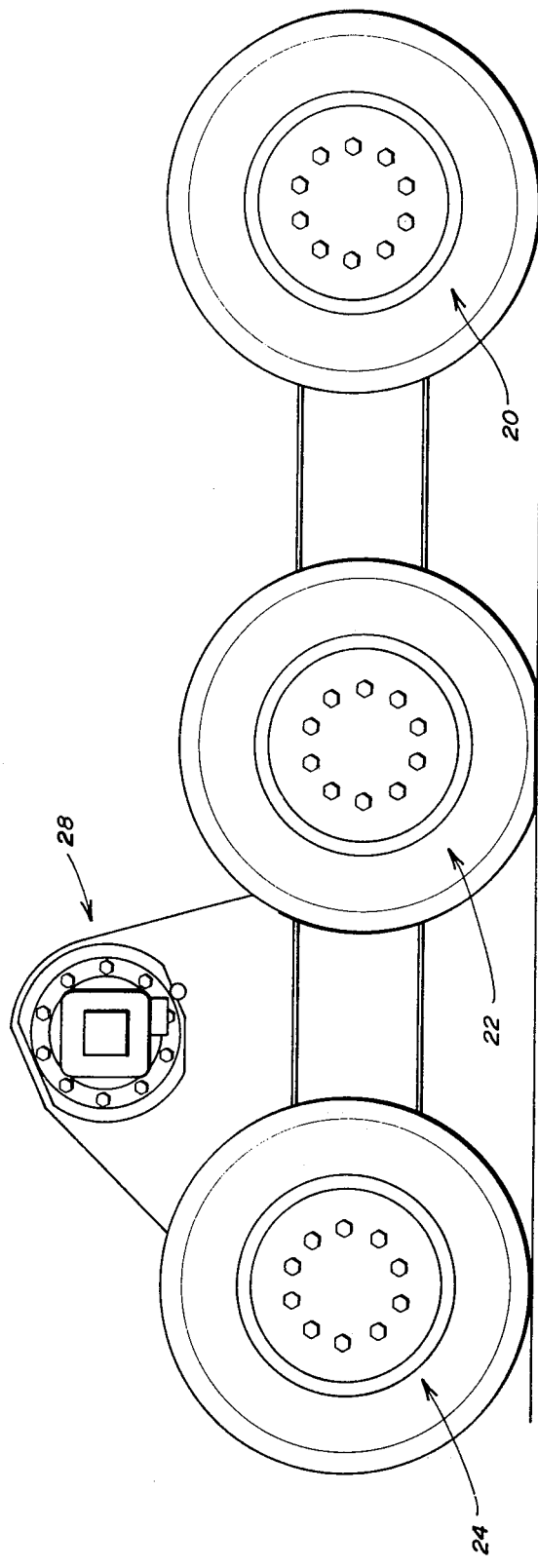
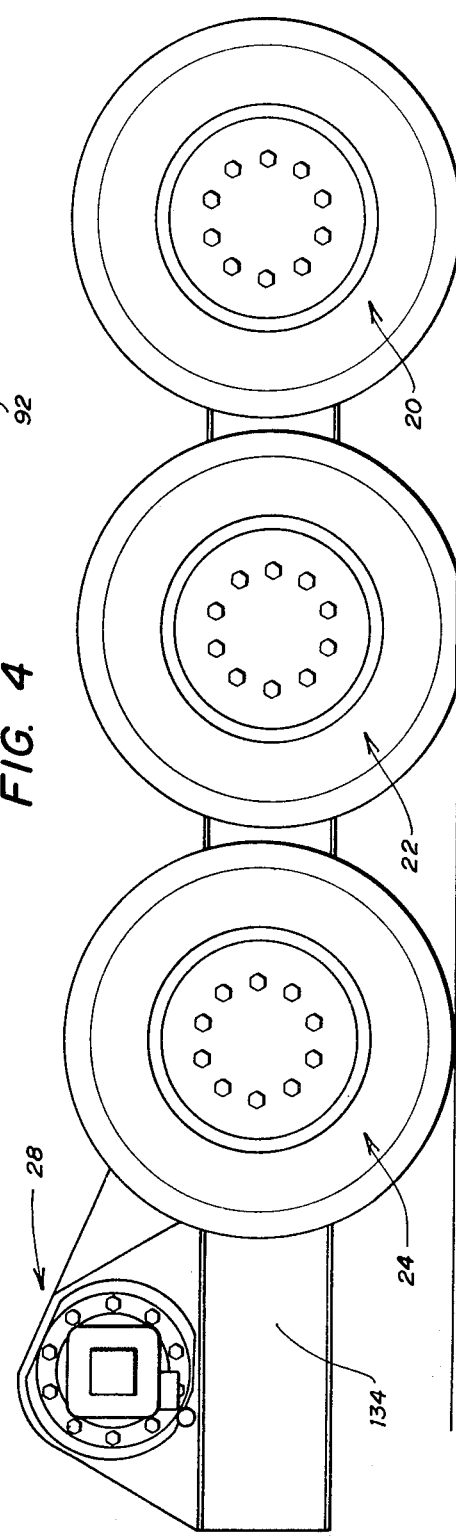
FIG. 4
FIG. 5

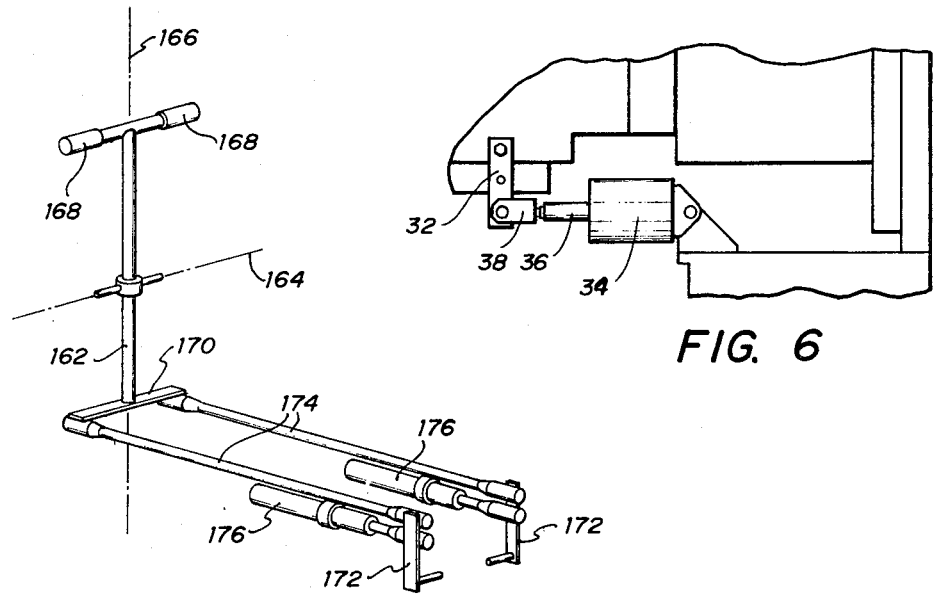
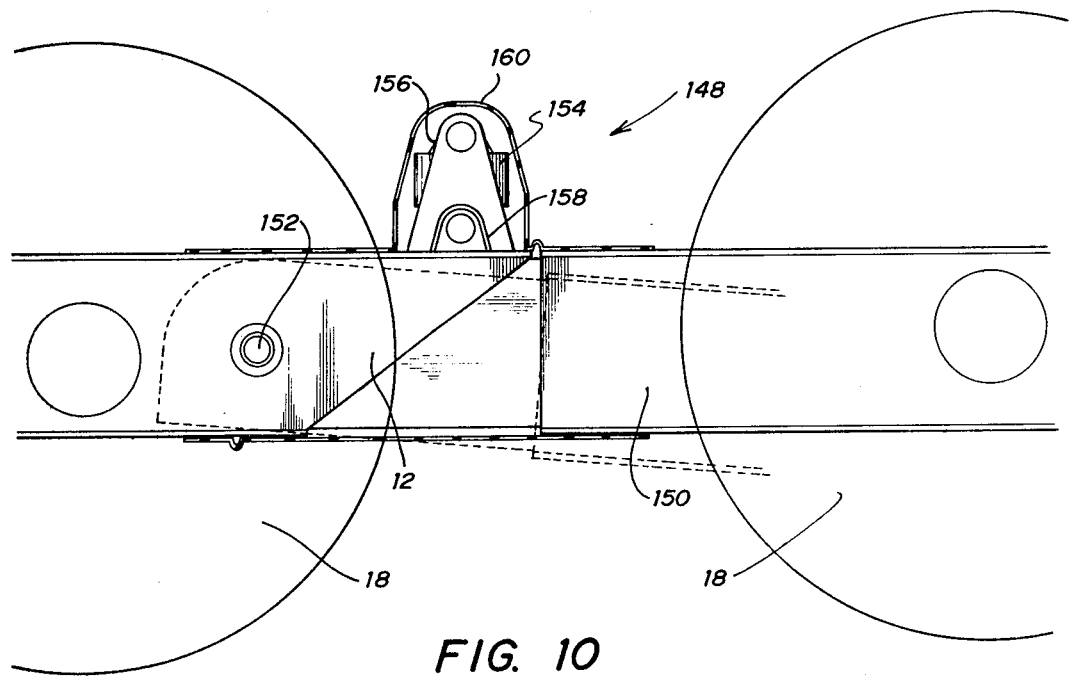

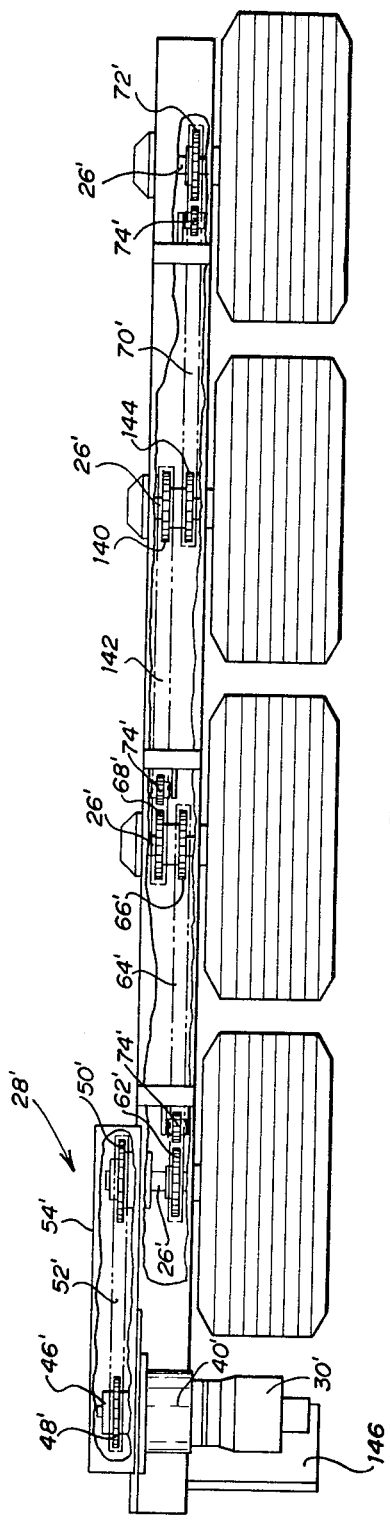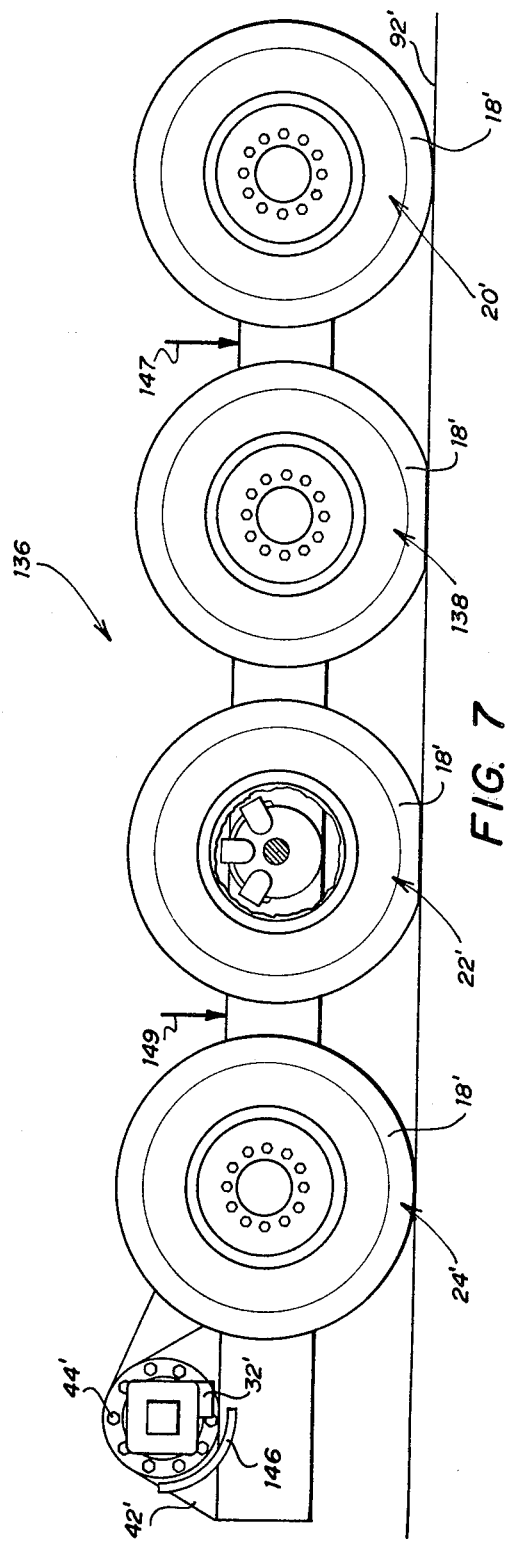

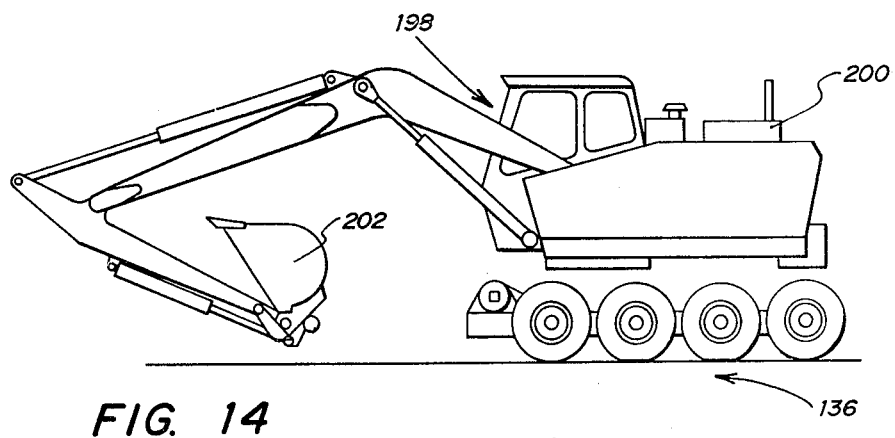
FIG. 14
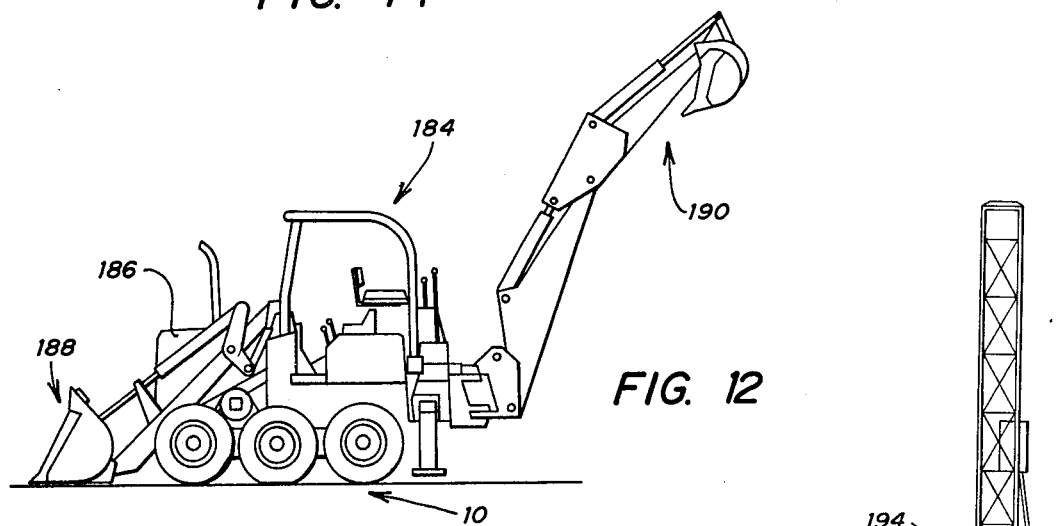
FIG. 12
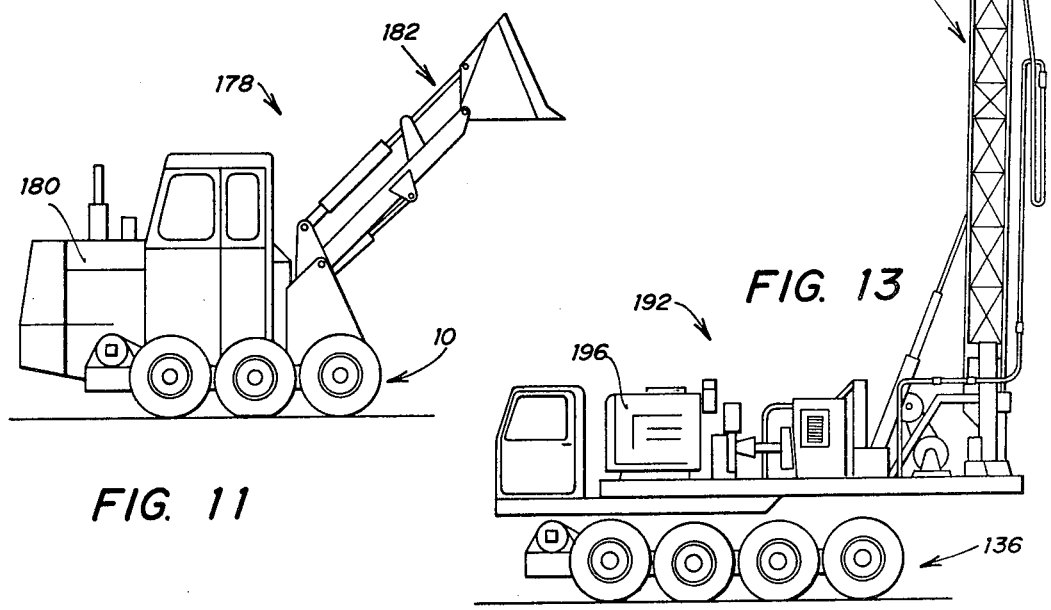
FIG. 13
FIG. 11

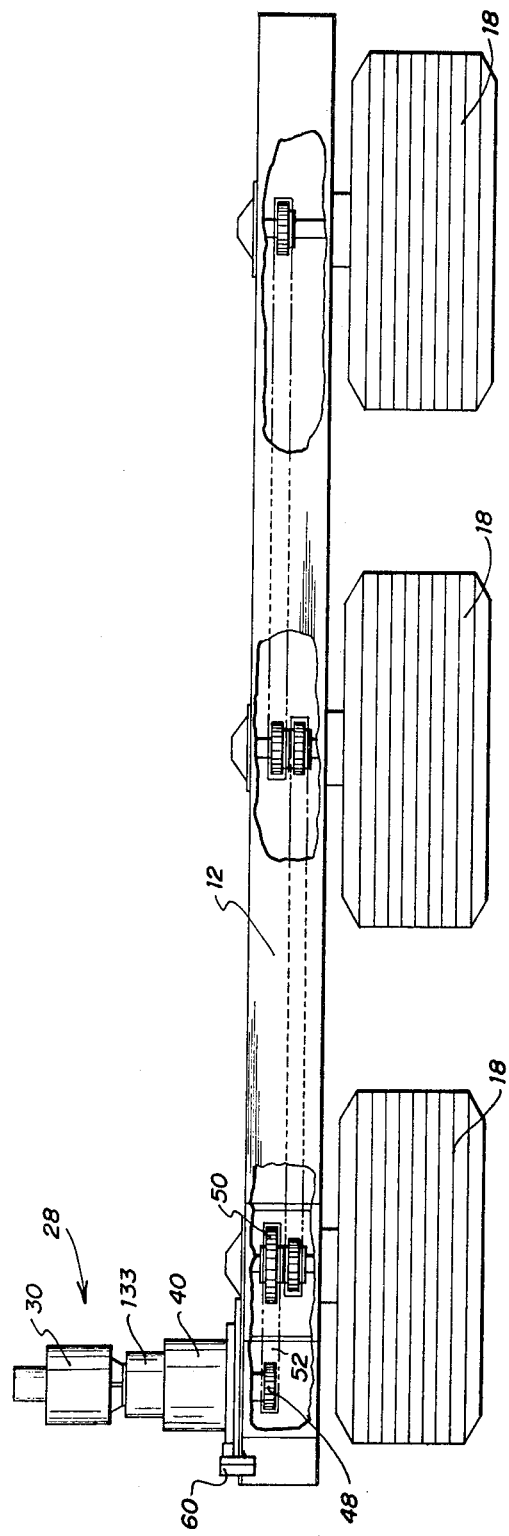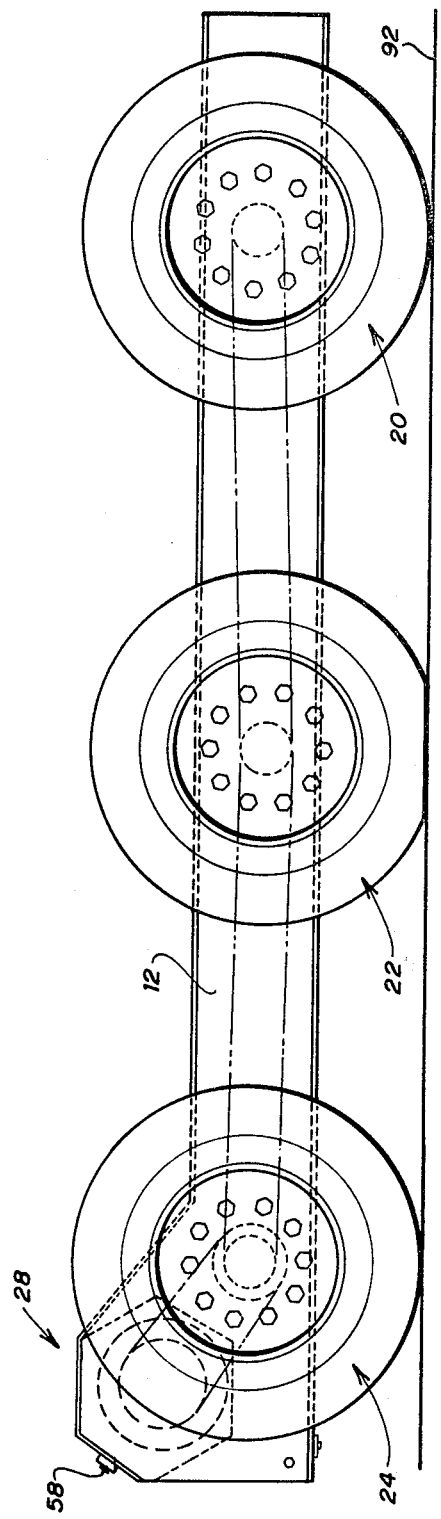

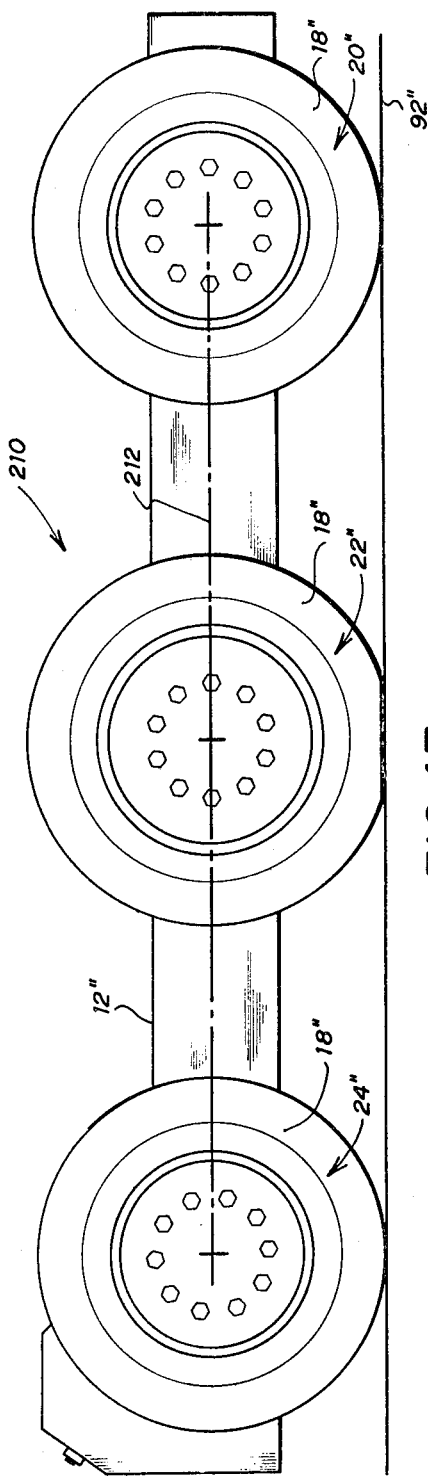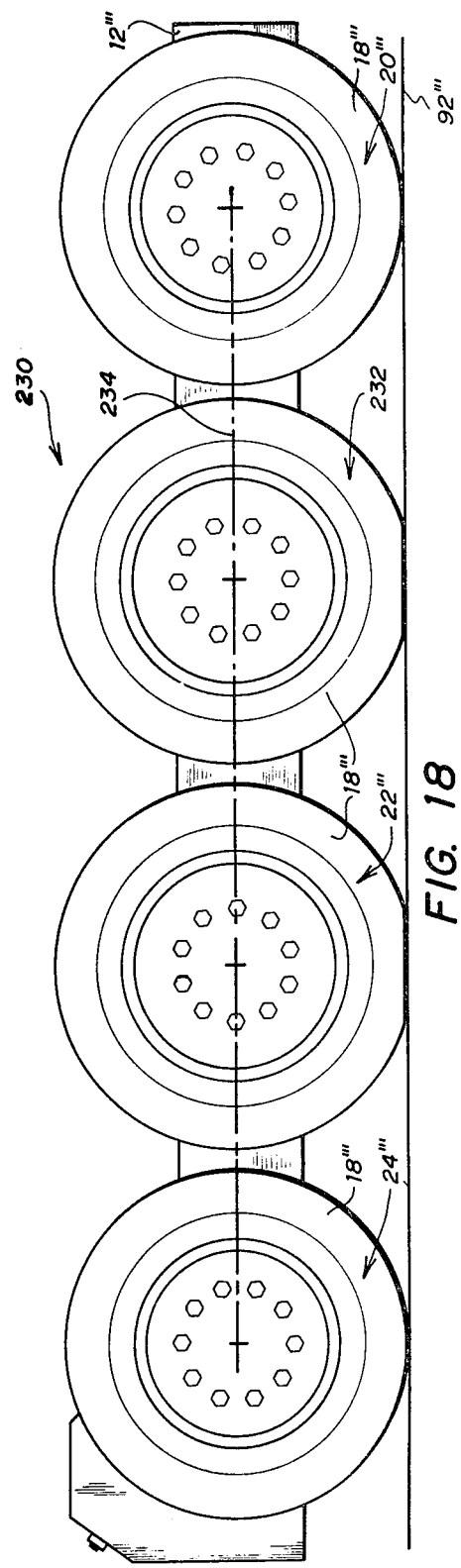

UNDERCARRIAGE FOR ADVERSE TERRAIN VEHICLES

CROSS REFERENCE TO RELATED APPLICATION

This application is a continuation-in-part of co-pending application Ser. No. 835,726, filed Sept. 22, 1977, now abandoned, which is a continuation-in-part of application Ser. No. 799,328, filed May 23, 1977, now abanoned.

TECHNICAL FIELD

This invention relates generally to undercarriages for adverse terrain vehicles, and more particularly to a detachable undercarriage having either three or four tired wheels which may be utilized to support and propel virtually any type of mechanism.

BACKGROUND ART

Traditionally, adverse terrain vehicles have been track type vehicles. For example, track type bulldozers, loaders, cranes, and similar devices have been known for decades. In some instances track type mechanisms of this type have utilized undercarriages to support and propel the mechanism. Such an undercarriage may comprise a frame for attachment to the mechanism, structure mounted on the frame for guiding a track around a predetermined course, and a drive motor for actuating the track around the course and thereby propelling the mechanism supported by the undercarriage.

More recently, adverse terrain vehicles utilizing tired wheels have been developed. For example, see U.S. Pat. No. 3,799,362 granted to applicants herein on Mar. 26, 1974. However, there has not heretofore been provided an undercarriage whereby a tired type vehicular supporting and propelling apparatus adapted for adverse terrain usage could be adapted to virtually any type of mechanism. It has also been found to be desirable to provide a tired type adverse terrain undercarriage having greater load carrying capacity than has been available heretofore.

DISCLOSURE OF INVENTION

The present invention comprises a detachable undercarriage for adverse terrain vehicles which overcomes the foregoing and other problems long since associated with the prior art. In accordance with the broader aspects of the invention, an undercarriage includes an elongate hollow frame having a plurality of axle members rotatably supported thereon. Each axle member extends to a wheel support member. Solid or pneumatic tired wheels can be utilized. Preferably all the wheel support members are positioned on the same side of the frame. A drive assembly includes a motor and a transmission mounted on the frame with a dual drive sprocket and separate chains connecting the output of the transmission to one of the endmost axle members and to a middle axle member driven by the transmission to the other endmost axle. The motor can be of either the hydraulic or electric variety.

Either three or four nonaligned axle members carrying wheels of equal diameters can be utilized. In the case of three axle members the center axle member and in the case of four axle members the center two axle members rotate about axes situated below a plane extending through the axes of rotation of the endmost two axle members. This facilitates the skid steering of a mechanism supported and propelled by the undercarriage, while simultaneously making wheels carried by all of the axle members available for ground contact under adverse terrain conditions. If desired, structure may be provided for bringing all of the axle members into alignment in order to provide increased stability.

Either three or four aligned axle members carrying wheels of unequal diameters can be utilized. The center axle in the case of three axle members and the center pair of axles in the case of four axle members carry wheels relatively larger than those carried by the endmost axle members. The same result is accomplished, namely the facilitation of skid steering of the mechanism supported and propelled by the undercarriage with the concurrent availability for ground contact under adverse terrain conditions of all the wheels.

In accordance with still other aspects of the invention, the frame is a hollow load-bearing structure comprised of structural members around its entire periphery and throughout its entire length. This facilitates attachment of a mechanism to the undercarriage at any point along the entire length and around the entire periphery of the frame. The positioning of the hydraulic or electric motor relative to the frame can be varied in order to vary the spacing between the axle members. The motor is preferably drivingly connected to one of the axle members by means of a first drive sprocket connected to the output of the motor, a second drive sprocket connected to one of the axle members, and a drive chain interconnecting the two drive sprockets.

BRIEF DESCRIPTION OF DRAWINGS

A more complete understanding of the invention may be had by referring to the following Detailed Description when taken in conjunction with the accompanying Drawings, wherein:

FIG. 1 is a side view of an undercarriage for an adverse terrain vehicle incorporating a first embodiment of the invention;

FIG. 2 is a top view of the undercarriage shown in FIG. 1 in which certain parts have been broken away more clearly to illustrate certain features of the invention;

FIG. 3b is an enlarged horizontal sectional view of the front portion of the undercarriage of FIG. 1, and comprising a continuation of FIG. 3a;

FIG. 4 is a side view of a first modification of the undercarriage of FIG. 1;

FIG. 5 is a side view of a second modification of the undercarriage of FIG. 1;

FIG. 6 is a side view of the speed shifter assembly mounted on the hydraulic motor of the undercarriage of FIG. 1;

FIG. 7 is a side view of the undercarriage for an adverse terrain vehicle incorporating a second embodiment of the invention;

FIG. 8 is a top view of the undercarriage shown in FIG. 7;

FIG. 9 is a diagrammatic illustration of a portion of a hydrostatic drive control apparatus used in conjunction with the present invention;

FIG. 10 is a detail of a wheel height adjustment assembly which may be used in conjunction with the invention;

FIG. 11 is an illustration of the application of the invention to a front-end loader;

FIG. 12 is an illustration of the application of the invention to a front-end loader with a backhoe;

FIG. 13 is an illustration of the application of the invention to a mobile drilling rig;

FIG. 14 is an illustration of the application of the invention to a backhoe;

FIG. 15 is a side view of a third modification of the undercarriage of FIG. 1;

FIG. 16 is a top view of the undercarriage shown in FIG. 15 in which certain parts have been broken away to illustrate more clearly certain features of the invention;

FIG. 17 is a side view of an undercarriage for an adverse terrain vehicle incorporating a third embodiment of the invention;

FIG. 18 is a side view of an undercarriage for an adverse terrain vehicle incorporating a fourth embodiment of the invention;

DETAILED DESCRIPTION

Figure 3A:
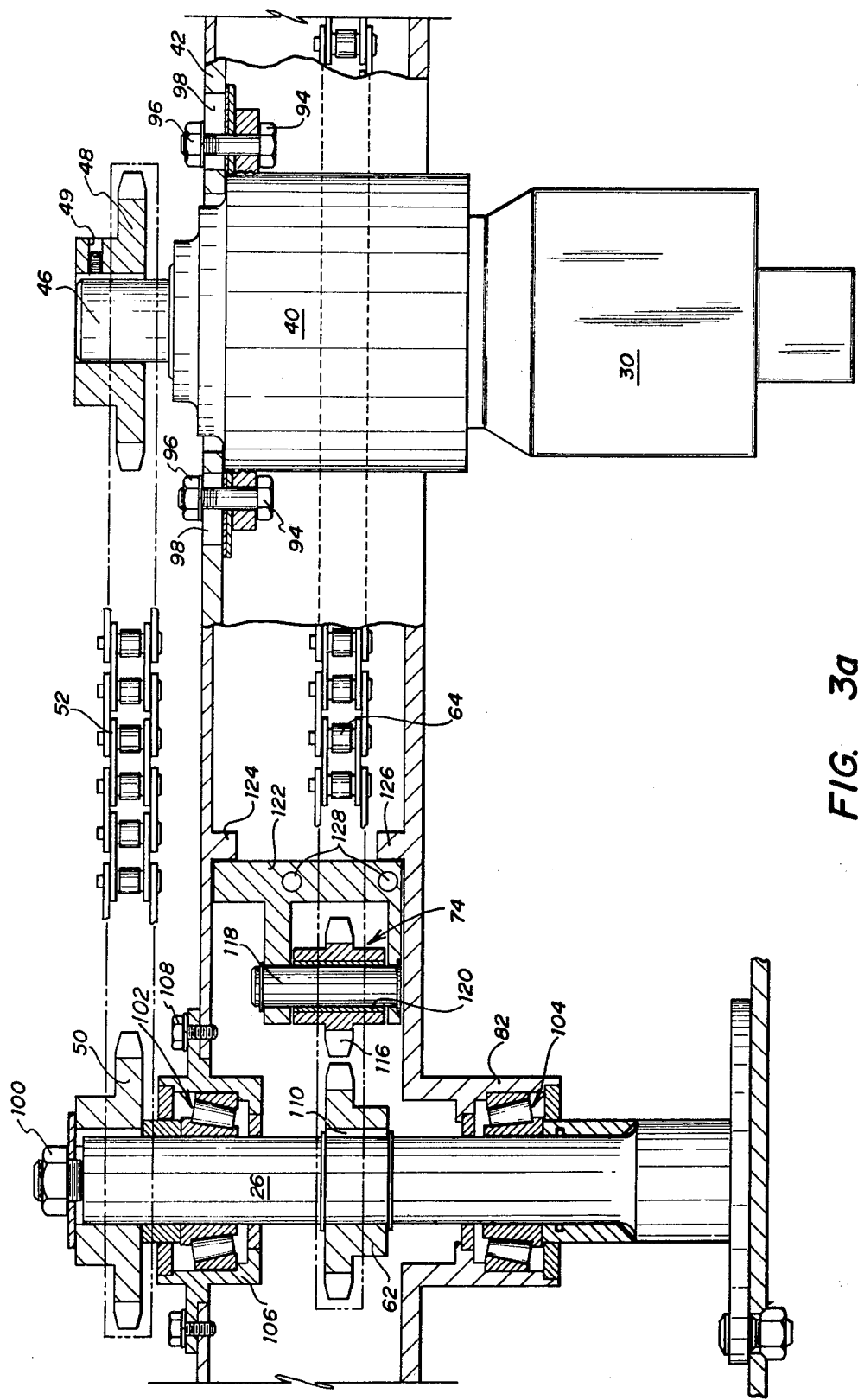
FIG. 3a is an enlarged horizontal sectional view of the rear portion of the undercarriage of FIG. 1.

Referring now to the Drawings, and particularly to FIGS. 1 and 2 thereof, there is shown a detachable undercarriage for an adverse terrain vehicle 10 incorporating the invention. Normally, of course, a pair of parallel undercarriages 10 are employed to support the adverse terrain vehicle. The undercarriage 10 consists of an elongate hollow load-bearing frame 12. Frame 12 is formed entirely of a material such as steel characterized by high strength and rigidity to permit attachment of undercarriage 10 to virtually any type of mechanism by connections at selected points along the entire length and around the entire periphery of frame 12. A related feature of this structure is greater load carrying capacity. Furthermore, frame 12 can be of sealed construction so that it can serve as a lubricant reservoir, if desired, as well as a structural member. Drain plugs 14 and 16 are located at the bottom and outside surfaces, respectively, of frame 12 to facilitate draining or replenishing of lubricants therein.

The undercarriage 10 is supported by three tired wheels 18; the three wheels including a forward wheel 20, a middle wheel 22, and a rear wheel 24. The wheels 18 are of equal diameter and include tires of either a solid or a pneumatic type. Wheels 18 rotate about axles 26. Preferably all three wheels 18 are positioned on the same side of frame 12; however, depending on the particular adverse terrain vehicle, it may be desirable to locate one wheel 18 on the opposite side of frame 12. Preferably, axles 26 extend completely through frame 12 and are rotatably supported within both adjacent vertical surfaces of frame 12.

Also included in undercarriage 10 is drive assembly 28. Drive assembly 28 incorporates a motor 30 which can be of a dual speed variety in that structure is provided within motor 30 for selecting either a high or low speed range of operation. Such selection is effected by manipulation of lever 32. Alternatively, motor 30 can be of the constant speed variety. In addition, motor 30 can be of the electric or the hydraulic types. Referring momentarily to FIG. 6 in conjunction with FIGS. 1 and 2, undercarriage 10 is provided with a fluid operated cylinder 34 having a piston 36 connected to lever 32 by means of link 38. Cylinder 34 is adapted for operation from a remote point, such as the opertor's compartment of an adverse terrain vehicle incorporating undercarriage 10, to selectively place motor 30 in the desired operational range.

Referring again to FIGS. 1 and 2, motor 30 is connected directly to speed reducer 40, which can be a multiple or constant speed type. Speed reducer 40 is slidably mounted on frame extension 42 by means of bolts 44. Frame extension 42 extends upwardly from the inside rearward top surface of frame 12 and speed reducer 40 is bolted substantially perpendicular thereto. Speed reducer 40 has output shaft 46 to which drive sprocket 48 is attached by means of setscrew 49, as is best shown in FIG. 3a. If, for example, motor 30 is of the hydraulic type, motive energy is received from the output of remotely located hydraulic pumps (not shown) driven by an engine mounted on the adverse terrain vehicle to which undercarriage 10 is attached. The power transmission by means of the pressurized hydraulic fluid from the aforementioned pumps, or from a remote power source (not shown) in the case of an electric motor, to motor 30 and hence to drive sprocket 48 through speed reducer 40 comprises the hydrostatic drive system which functions to both propel and steer undercarriage 10.

Motive power is first applied to drive sprocket 48 which is constrained to second sprocket 50 by means of chain 52. Chain 52, which is constrained around drive sprocket 48 and second sprocket 50, serves to transfer rotative movement to axle 26, upon which first sprocket 50 is mounted. Sprockets 48 and 50 and chain 52 are totally enclosed in a sealed housing 54 which is detachably secured to both frame extension 42 and frame 12. Housing 54 serves not only to protect these parts of the drive system, but more importantly, can constitute a reservoir for lubricant in which chain 52 and sprockets 48 and 50 continuously operate. Accordingly, drain plug 56 is provided at the rearward lower end of housing 54.

A tension adjusting means for chain 52 is provided in bolt 58. Bolt 58 is threadably mounted on brace 60 and acts in compression directly against the collar of speed reducer 40, which is slidably mounted on frame extension 42. Thus, by either clockwise or counterclockwise rotation of bolts 58, tension in chain 52 may be varied.

Motor 30 is in direct operative relationship with the forward, middle and rearward wheels, 20, 22, and 24, respectively, of undercarriage 10. Constituting part of the drive system, axle 26 of rear wheel 24 receives power by means of first sprocket 50 which is connected to drive sprocket 48 by means of chain 52. Also attached to axle 26 of rear wheel 24 is sprocket 62. Sprocket 62 is coupled by means of chain 64 to sprocket 66, which is connected to the axle 26 of middle wheel 22. Sprocket 68 is also attached to the axle 26 of the middle wheels 22 of the set, and in turn is coupled by means of chain 70 to sprocket 72. Sprocket 72 is secured to the axle 26 of the forward wheel 20 of the set, whereby motor 30 is operatively connected to all three wheels 18 on undercarriage 10. Tension adjustment assemblies 74 are provided for assuring proper tension in chains 64 and 70.

In order to arrest movement of undercarriage 10, brake assembly 76 is provided. Brake assembly 76 consists of a brake disc 78 and three caliper assemblies 80. Turning momentarily to FIG. 3b in conjunction with FIGS. 1 and 2, caliper assemblies 80 (only one of which is shown) are anchored to frame extension 82 by means of bolts 84. Consequently, the caliper assemblies 80 remain stationary at all times, while the brake disc 78, which is secured to axle 26 of the middle wheel 22, rotates therewith. Specifically, brake disc 78 rotates within the slots of the three caliper assemblies 80 which house the brake pucks and their hydraulic actuating cylinders. To arrest movement of the undercarriage 10, the actuating cylinders cause the pucks to frictionally engage discs 78. By means of chains 64 and 70, this braking force is directly transmitted to the rearward and forward wheels, 24 and 20, respectively. In this manner, the force of one brake assembly 76 is simultaneously applied to all wheels on the undercarriage 10. It will be noted that brake assembly 76 is disposed to the interior of axle spindle 86, to which wheel rim 88 is secured by threaded lugs 90. This location for brake assembly 76 is advantageous in that it affords protection from dirt, rocks, mud or other debris typically encountered by an adverse terrain vehicle.

Middle wheel 22 protrudes below a plane 92 extending tangent to the bottom surfaces of the wheels 18 comprising the forward wheel 20 and the rear wheel 24. This fact embodies a significant feature of the present invention. A relatively short wheelbase is desirable because it facilitates skid steering of the vehicle. However, this advantage is offset by decreased overall vehicle stability, which is especially troublesome in the case of an adverse terrain vehicle with variable loading arrangemets. In contrast, a longer wheelbase affords maximum vehicle stability but does not permit effective skid steering.

The present invention economically and simply accomplishes the objectives of both short and long wheelbases by means of a lower middle wheel 22. For example, when operated over a hard, smooth surface, undercarriage 10 will be able to rock either forwardly or backwardly, depending upon the location of the center of gravity and the loading characteristics of the particular adverse terrain vehicle. The vehicle rests on only two wheels at any given moment, while an end wheel remains available for stabilization. Therefore, the wheelbase of the vehicle will comprise the distance between the middle wheel 22 and one of the endmost wheels, either 20 or 24. Consequently, the effort required to effect skid steering of the vehicle is substantially reduced over that which would be required if the wheelbase always comprised the distance between the endmost wheels 20 and 24. At the same time, the rocking feature of undercarriage 10 allows instant utilization of the stability inherent in a longer wheelbase.

Assume now that the vehicle to which undercarriage 10 is attached is operated over a softer surface, such as sand, mud or loose dirt. All three tired wheels 18 will engage the adverse surface because they will sink into the adverse surface until vehicle flotation occurs. Superior traction, stability and maneuverability will be achieved since wheel 18 directly contacts the surface, and all wheels 18 are drivingly interconnected. Furthermore, total pressure under any individual wheel is substantially reduced, which lessens surface rutting as well as the vehicle's susceptibility to bogging down.

Turning now to FIGS. 3a and 3b, there is shown in detail the drive system for undercarriage 10. Motor 30 is coupled to speed reducer 40. Speed reducer 40 is attached to frame extension 42 by means of bolts 94 in conjunction with nuts 96. By means of slots 98, speed reducer 40 is adapted for slidable movement relative to frame extension 42 when acted upon by tension adjusting bolt 58, which is best shown in FIG. 1. Attached to the output shaft 46 of the speed reducer 40 is sprocket 48. Setscrew 49 secures sprocket 48 to output shaft 46. Chain 52 in turn connects sprocket 48 to sprocket 50. Sprocket 50 is affixed to axle 26 of rear wheel 24 by means of nut 100. It will be noted that all three axles 26 are rotatably supported by the inner bearing assemblies 102 and outer bearing assemblies 104. Inner bearing assemblies 102 are supported by cups 106 which are detachably secured to frame 12 by means of bolts 108. In contrast, outer bearing assemblies 104 are permanently affixed to frame extensions 82 of frame 12.

Sprocket 62 is also attached to axle 26 of rear wheel 24 by means of keyway 110, thus sprocket 62 rotates in unison with sprocket 50. Sprocket 62 in turn is connected by means of chain 64 to sprocket 66, which is secured to axle 26 of middle wheel 22 by means of a keyway 112. Located substantially adjacent to sprocket 66 and also attached to axle 26 of middle wheel 22 by means of keyway 112 is sprocket 68. Chain 70 is constrained for rotation around sprockets 68 and 72. Sprocket 72 is affixed to axle 26 of forward wheel 20 by means of keyway 114. Consequently motor 30 is directly connected by a series of sprockets and chains to each wheel 18 of undercarriage 10.

The tension in chains 64 and 70 is adjusted by means of forward and rear tension adjustment assemblies 74. Tension adjustment assemblies 74 include idler sprockets 116 which engage the slack or return sides of either chain 64 or 70. Idler sprocket 116 is rotatably connected to pin 118 by means of journal bearing 120. The pin 118 which rotatably supports idler sprocket 116 is disposed and secured between two vertical adjacent wall surfaces of slider assembly 122. Slider assembly 122 is constrained for vertical movement by stops 124 and 126. Vertical movement of slider assembly 122 is accomplished by means of adjustable screws 128. Either clockwise or counterclockwise movement of adjustable screws 128 serves to displace slider assembly 122 vertically, whereby idler sprocket 116 engages idler chains 64 or 70 so as to change the tension therein. For example, if idler sprocket 116 of forward tension adjustment assembly 74 were manipulated in a vertical direction, it would engage chain 70 so as to cause a small but significant increase in the effective travel distance thereof. This in turn would cause chain 70 to experience an increase in tension, because it is of substantially fixed length.

Protective covers 130 are provided to protect the inward ends of axles 26 of forward wheel 20 and middle wheel 22. Covers 130 are secured to bearing cup 106 by means of screws 132. Consequently, all inward ends of axles 26 on undercarriage 10 are shielded from rocks, dirt, mud, or other hazards to be found in the terrain over which the adverse terrain vehicle is likely to operate.

The foregoing description was directed to the preferred construction of undercarriage 10 wherein each wheel 18 is interconnected by a series of sprockets and chains. However, it will be understood that undercarriage 10 can be operated with other transmission means, such as gears or other means; and such that motor 30 is drivingly connected to fewer than all of the wheels 18. For example, motor 30 can be drivingly connected to rear wheel 24 and middle wheel 22 only, thereby eliminating the need for sprockets 68 and 72, chain 70, and forward tension adjustment assembly 74 all of which serve to interconnect forward wheel 20 and middle wheel 22.

Referring now to FIGS. 4 and 5, there are shown two modifications of the three wheel undercarriage for an adverse terrain vehicle 10. Referring particularly to FIG. 4, there is shown an alternative position for the hydrostatic drive assembly 28. The position illustrated in FIG. 4 is higher and more rearward than that depicted in FIGS. 1 and 2, but still disposed substantially between rear wheel 24 and middle wheel 22. The wheel spacing in FIG. 4 is relatively closer than that shown in FIGS. 1 and 2. FIG. 5 illustrates another alternative position for hydrostatic drive assembly 28 which permits reduced wheel spacing of undercarriage 10 over that shown in FIG. 4. In this modification, drive assembly 28 is mounted on rear frame extension 134. The closer wheel placement permitted by the modifications appearing in FIGS. 4 and 5 facilitates skid steering of undercarriage 10 because the effort required is substantially reduced over that which would be required if the wheel base were longer. Accordingly, not only are the power requirements for steering the vehicle lowered, but overall vehicle response is improved. Moreover, the feature of being able to vary the wheel spacing and/or the hydrostatic drive housing location considerably enhances the adaptability of undercarrige 10 to virtually any type of adverse terrain vehicle.

Referring now to FIGS. 15 and 16, there is shown another modification of the three wheel undercarriage for an adverse terrain vehicle 10. At least two significant features attend this modification. First, instead of supporting hydrostatic drive assembly 28 with a frame extension attached to the top surface of frame 12, drive assembly 28 is slidably mounted directly on the rear portion of frame 12. Frame 12 in FIGS. 15 and 16 includes an integral raised rear portion which serves to house and protect sprockets 48 and 50, and drive chain 52. Besides eliminating the need for a separate housing to protect these parts of the drive system, placement of drive assembly 28 on the side of frame 12 opposite wheels 18 makes it less vulnerable to flying rocks, dirt, mud and objects likely to be picked up by the wheels of the vehicle. In addition, this location for drive assembly 28 allows a lower profile which further enchances adaptability of undercarriage 10 to various types of adverse terrain vehicles. Bolt 58 is threadably mounted on brace 60 which is now attached directly to the rear top and side portions of frame 12. Bolt 58 acts in tension directly on the collar of speed reducer 40 to serve as a tension adjusting means for chain 52. The absence of of brake assembly 76 secured to middle wheel 22 comprises the second feature of the modification illustrated in FIGS. 15 and 16. Instead, brake assembly 133 is positioned directly between motor 30 and speed reducer 40. Brake 133 may be of the AUSCO brand fail-safe type produced by Auto Specialties Manufacturing Co. of St. Joseph, Michigan. It has been found that placement of brake 133 in drive assembly 28 requires lower braking effort which results in increased brake efficiency. If desired, access plates (not shown) can be located in the upper surface of frame 12 above the axles for wheels 18. In all other respects undercarriage 10 with the modification shown in FIGS. 15 and 16 operates as was described above.

Referring now to FIGS. 7 and 8, there is shown an undercarriage for an adverse terrain vehicle 136 incorporating a second embodiment of the invention. The undercarriage 136 incorporates numerous component parts which are substantially identical in construction and operation to the component parts of undercarriage 10 illustrated in FIGS. 1 and 2. Such identical component parts are designated in FIGS. 7 and 8 with the same reference numeral utilized in the description of undercarriage 10, but are differentiated therefrom by means of a prime (') designation.

The primary differentiation between undercarriage 10 and undercarriage 136 is the fact of a four tired wheel embodiment, wherein wheel 138 is the fourth wheel. The extra wheel 138 is in fact another middle wheel. The middle wheels 22' and 138 extend below plane 92' which is tangent to the bottom surfaces of wheels 20' and 24'. All wheels 18' are of equal diameter and include tires of either a solid or a pneumatic type. However, the addition of lower middle wheel 138 requires the addition of two more sprockets, 140 and 144, and another chain 142, and may necessitate an additional brake assembly 76'.

In many respects similar to the three wheel configuration, the transmission of power in the four wheel configuration shown in FIGS. 7 and 8 proceeds as follows. The hydrostatic drive assembly 28' is mounted on the rearmost upper surface of undercarriage 136 and includes motor 30'. Motor 30' is connected directly to speed reducer 40'. Attached to the output shaft 46' of speed reducer 40' is sprocket 48'. Chain 52' is constrained for rotation about sprockets 48' and 50'. Sprocket 50' in turn is secured to the axle 26' of rear wheel 24'. Also attached to the axle 26' of rear wheel 24' is sprocket 62'. Connected by chain 64', sprocket 66' is constrained to rotate in unison with sprocket 62'. Sprocket 66' is mounted on axle 26' of middle wheel 22', as is sprocket 68'. Chain 142 in turn connects sprocket 140, which is affixed to axle 26' on second middle wheel 138, and sprocket 68'. Sprocket 144, which is also attached to axle 26' of second middle wheel 138, is connected by means of chain 70' to sprocket 72' which is mounted on axle 26' of forward wheel 20'. Thus, it is apparent that motor 30' is in direct mechanical communication with all four wheels of undercarriage 136 by virtue of the aforementioned arrangement of sprockets and chains. It will be understood that undercarriage 136 can be operated where motor 30' is drivingly connected to fewer than all four wheels. Note also that hydrostatic drive guard 146 is provided at a rearward lower position on undercarriage 136 adjacent to drive assembly 28' so as to protect it from the hazards of operation over adverse terrain. In all other respects, the four wheel embodiment illustrated in FIGS. 7 and 8 operates substantially the same as the three wheel embodiment shown in FIGS. 1 and 2.

In certain applications, it may be desirable to adjust the height of an end wheel of undercarriage 10, or one or both end wheels of undercarriage 136. Referring now to FIG. 10, there is shown a wheel height adjustment assembly 148. Adjustment assembly 148 comprises a subframe 150 which is pivotally attached to frame 12 at pin 152. The outside vertical walls of subframe 150 are interposed between the inside vertical walls of frame 12 so as to allow connection at, and pivotal movement about, pin 152. A hydraulic cylinder 154 is attached at one end to a frame 156 mounted on frame 12, and at the other end to a frame 158 mounted on subframe 150. A boot 160 of highly resilient, flexible material is securely attached to seal the gap existing between frame 12 and subframe 150. When actuated, cylinder 154 causes subframe 150 to pivot downwardly about pin 152 so as to bring into alignment the axes of rotation of wheels 18. Turning momentarily to FIGS. 1 and 2 in conjunction with FIG. 10, it will be seen that provision has been made for the incorporation of one wheel height adjustment assembly 148 in the three wheel embodiment shown therein, at the location indicated by arrow 148a. Wheel height adjustment assembly 148 is positioned between forward wheel 20 and middle wheel 22. Upon actuation of hydraulic cylinder 154, subframe 150 will pivot downwardly about pin 152 so as to bring the axes of rotation of wheels 20, 22 and 24 into alignment.

In contrast to the three wheel embodiment of undercarriage 10, two wheel height adjustment assemblies 148, indicated by arrows 147 and 149, can be incorporated in the four wheel embodiment of undercarriage 136. Having reference momentarily to FIGS. 7 and 8 in conjunction with FIG. 10, it will be seen that forward wheel height adjustment assembly 148 is located between forward wheel 20' and middle wheel 138, while rear wheel height adjustment assembly 148 is positioned between rear wheel 24' and middle wheel 22'. Upon actuation of hydraulic cylinder 154 of forward wheel height adjustment assembly 148, subframe 150 will pivot downwardly to bring into alignment the axes of rotation of the forward three wheels of undercarriage 136. Similarly, the axes of rotation of the rearward three wheels of undercarriage 136 will become aligned upon the urging of cylinder 154 of rear wheel height adjustment assembly 148. The simultaneous actuation of cylinders 154 in both assemblies will cause the axes of rotation of all four wheels 18' to come into alignment.

The incorporation of wheel height adjustment assemblies 148 affords a significant advantage in both the three and four wheel lowered center wheel embodiments of the invention. Primarily it will effect better weight distribution and hence impart greater vehicle stability. In particular, during operation of the adverse terrain vehicle over a hard surface, the operator may selectively lower the end wheel or wheels should the skid steering advantages of a short wheelbase no longer be desired. For example, it might be desirable to stabilize a mobile drill rig incorporating the invention after the vehicle has been maneuvered into place. The capability of selectively nullifying the rocking feature of the present invention is particularly useful to vehicles whose center of gravity shifts during various operational modes. It will be understood that soft surface operation of a vehicle incorporating the invention is the same with or without the wheel height adjustment feature. All wheels will contact the soft surface, thus improving the vehicle's traction and flotation characteristics.

With reference to FIG. 17, there is shown an undercarriage for an adverse terrain vehicle 210 incorporating a third embodiment of the invention. The undercarriage 210 includes numerous component parts which are substantially identical in construction and operation to the component parts of undercarriage 10 illustrated in FIGS. 1 and 2. Such identical component parts are designated in FIG. 17 with the same reference numeral utilized in the description of undercarriage 10, but are differentiated therefrom by means of a double prime (") designation.

The primary distinction between undercarriage 210 and undercarriage 10 is the fact of a three tired wheel embodiment wherein the diameters of the wheels 18" are not identical. More particularly, middle wheel 22" is of relatively larger diameter than are the endmost wheels 20" and 24". Additionally, each wheel 18" rotates about an axle lying on a common line of centers, which is denoted by line 212. Thus, larger middle wheel 22" still protrudes below the plane 92" extending tangent to the bottom surfaces of forward wheel 20" and rear wheel 24", but for completely different reasons than its counterpart in undercarriage 10.

The fact of an aligned larger center wheel comprises a significant feature of this embodiment. The objectives of both a short and a long wheelbase are accomplished by means of larger middle wheel 22". For example, when operated over a hard, smooth surface undercarriage 210 will be able to rock either forwardly or backwardly, depending upon the location of the center of gravity and the loading characteristics of the particular adverse terrain vehicle. The vehicle rests on only two wheels at any given moment, while the other wheel remains available for stabilization. Consequently, the wheelbase of the vehicle when operated over a hard, smooth surface is the distance between wheel 22" and one of the endmost wheels, either 20" or 24". The effort required to effect skid steering of the vehicle is substantially reduced with a shorter wheelbase, while the rocking feature of undercarriage 210 allows recourse to the stability inherent with a longer wheelbase. It will be noted that if middle wheel 22" includes a pneumatic tire, the partial deflation thereof will serve to neutralize the rocking feature and bring all three wheels 18" into contact with the hard, smooth surface to improve vehicle traction and stability. Conversely, greater inflation of middle wheel 22" will serve to augment the rocking feature, if desired. Of course, during operation of undercarriage 210 over a softer surface, all three tired wheels 18" engage the adverse surface because they will sink into the surface until vehicle flotation occurs. Moreover, alignment of the axles of wheels 18" improves the vehicle performance over both hard and soft surfaces by reducing porpoising and other control problems associated with multiple nonaligned drive wheels. The power transmission and other aspects of the aligned three wheel embodiment illustrated in FIG. 17 are substantially identical to that of the nonaligned three wheel embodiment shown in FIGS. 1 and 2, and the modifications thereof, which were discussed hereinbefore.

Turning now to FIG. 18, there is shown an undercarriage for an adverse terrain vehicle 230 incorporating a fourth embodiment of the invention. The undercarriage 230 includes numerous component parts which are substantially identical in construction and operation to the component parts of undercarriage 136 illustrated in FIGS. 7 and 8. Such identical component parts are designated in FIG. 18 with the same reference numeral utilized in the description of undercarrige 136, but are differentiated therefrom by means of a triple prime ('") designation.

The primary distinction between undercarriage 230 and undercarriage 136 is the fact of a four tired wheel embodiment wherein the diameters of the wheels 18''' are not identical. More particularly, middle wheels 22''' and 232 are of relatively larger diameter than are the endmost wheels 20''' and 24'''. Additionally, each wheel 18''' rotates about an axle lying on a common line of centers, which is denoted by line 234. Thus, larger middle wheels 22''' and 232 protrude below the plane 92''' extending tangent to the bottom surfaces of forward wheel 20''' and rear wheel 24'40 ', but for completely different reasons than their counterparts in undercarriage 136.

The fact of aligned larger center wheels comprises a significant feature of this embodiment. The objectives of both a short and a long wheelbase is accomplished by means of larger middle wheels 22''' and 232. For example, when operated over a hard, smooth surface, undercarriage 230 will be able to rock either forwardly or backwardly, depending upon the location of the center of gravity and the loading characteristics of the particular adverse terrain vehicle. The vehicle rests on only three wheels at any given moment, while the other wheel remains available for stabilization. Consequently, the wheelbase of the vehicle when operated over a hard, smooth surface is the distance between wheels 22''' and 232 and one of the endmost wheels, either 20''' or 24'''. Therefore, the effort required to effect skid steering of the vehicle is substantially reduced with a shorter wheelbase, while the rocking feature of undercarriage 230 allows recourse to the stability inherent with a longer wheelbase. It will be noted that if the center wheels 18''' include pneumatic tires, the partial deflation thereof will serve to neutralize the rocking feature to bring all four wheels 18''' into contact with the hard, smooth surface improving vehicle traction and stability. Conversely, greater inflation of middle wheels 22''' and 232 will serve to augment the rocking feature, if desired. Of course, during operation of undercarriage 230 over a softer surface, all four tired wheels 18''' engage the adverse surface because they will sink into the surface until vehicle flotation occurs. Moreover, alignment of the axles of wheels 18''' improves the vehicle performance over both hard and soft surfaces by reducing porpoising and other control problems associated with multiple nonaligned drive wheels. The power transmission and other aspects of the aligned three wheel embodiment illustrated in FIG. 18 are substantially identical to that of the nonaligned four wheel embodiment depicted in FIGS. 7 and 8, and the modifications thereof, which were discussed previously.

Referring now to FIG. 9, there is shown a T-handle 162 which can be mounted in the cockpit of the adverse terrain vehicle to which the invention is attached. T-handle 162 performs the function of controlling the flow of energy from a remote source (not shown) to the motor(s) of the hydrostatic drive system. The T-handle 162 is supported for pivotal movement about horizontal and vertical axes 164 and 166, respectively. The handle 162 includes a pair of handle grips 168 and a lower portion 170 extending parallel to handle grips 168. Thus, manipulation of the handle grips 168 relative to axes 164 and 166 results in a directly corresponding motion in lower handle portion 170.

The lower handle portion 170 of the T-handle 162 is coupled to a pair of levers 172 by means of a pair of links 174. The levers 172 serve to control the energy flow rate to the motors. In this way, the T-handle 162 is operable to provide complete control over the direction, speed, and steering of the vehicle incorporating the invention. Manipulation of the T-handle 162 solely about the horizontal axis 164 causes movement of both the levers 172 in the same direction by null same amounts. By this means, the motors are actuated in synchronism for propulsion of the vehicle either forwardly or rearwardly along a straight line. Similarly, manipulation of T-handle 162 solely about the vertical axis 166 causes equal and opposite flow of motive energy to the motors whereby the vehicle pivots about its center, but does not move either forward or rearward. Of course, any combination of manipulations about axes 164 and 166 is possible to effect complete control of the adverse terrain vehicle. A pair of springs 176 are provided for returning the levers 172 to their center or nil position wherein the remote power source (not shown) provides no output to the motors.

In reference now to FIGS. 11-14, there are shown several vehicles to which either the lowered center wheel(s) or larger center wheel(s) embodiments of the undercarriage of the present invention can be adapted. Although each vehicle has a different operational and loading profile, the present invention is equally compatible with all. It will be understood that wheel height adjustment assemblies 147 and 149, or 148 can be adapted to each vehicle utilizing lowered center wheels to impart additional stability, if desired.

FIG. 11 illustrates application of the undercarriage 10 to a front-end loader 178. The heaviest component of the machine, the engine 180, is located to the rear of the vehicle. In the unloaded condition, with the bucket 182 retracted and empty, the center of gravity is located rearward near the engine 180 so that the vehicle rests on its rear and middle pairs of wheels. After loading and upon extension of the unloaded bucket 182, the center of gravity shifts forward, which causes the vehicle to rock forward to rest upon its forward and middle pairs of wheels.

Shown in FIG. 12, borne by undercarriage 10, is a front-end loader 184 equipped with a backhoe 190. The engine 186 is mounted forward. The center of gravity will be located forward near the engine 186 when the empty bucket 188 is retracted, and the empty backhoe 190 is tucked in. The vehicle in the unloaded configuration will thus be supported by its forward and middle sets of wheels. If the bucket 188 alone is loaded and extended, the vehicle's center of gravity remains forward and the vehicle will continue to rest on its forward and middle pairs of wheels. If only the backhoe 190 is manipulated, the center of gravity will shift rearward causing the vehicle to rock back and rest on its rearward and middle pairs of wheels. Of course, during combined operation of the bucket 188 and the backhoe 190, the vehicle may rock either forwardly or rearwardly depending on the relative loads manipulated.

FIG. 13 depicts undercarriage 136 as applied to a mobile drilling rig 192. During transportation, the drilling mast 194 lies substantially parallel to the vehicle. The weight of the mast 194 when added to that of the forwardly located engine 196 causes the vehicle to rest upon its forward and middle pairs of wheels. Upon raising mast 194 into drilling position, the center of gravity shifts rearward to reposition the vehicle on the rearward and middle sets of wheels.

Another backhoe 198 is shown in FIG. 14 supported on undercarriage 136. Owing to the rearward engine 200 location, the vehicle rests on its rearward and middle pairs of wheels when the bucket 202 is tucked in and empty. During manipulation of the bucket 202, the vehicle rocks forward to be supported by the forward and middle pairs of wheels.

While each of the example applications of the invention appearing in FIGS. 11–14 was discussed above as though the vehicle were operating over hard, smooth terrain, it will be understood that while operating over softer terrain, all wheels would contact the surface, achieving better flotation and traction.

Figure 19:
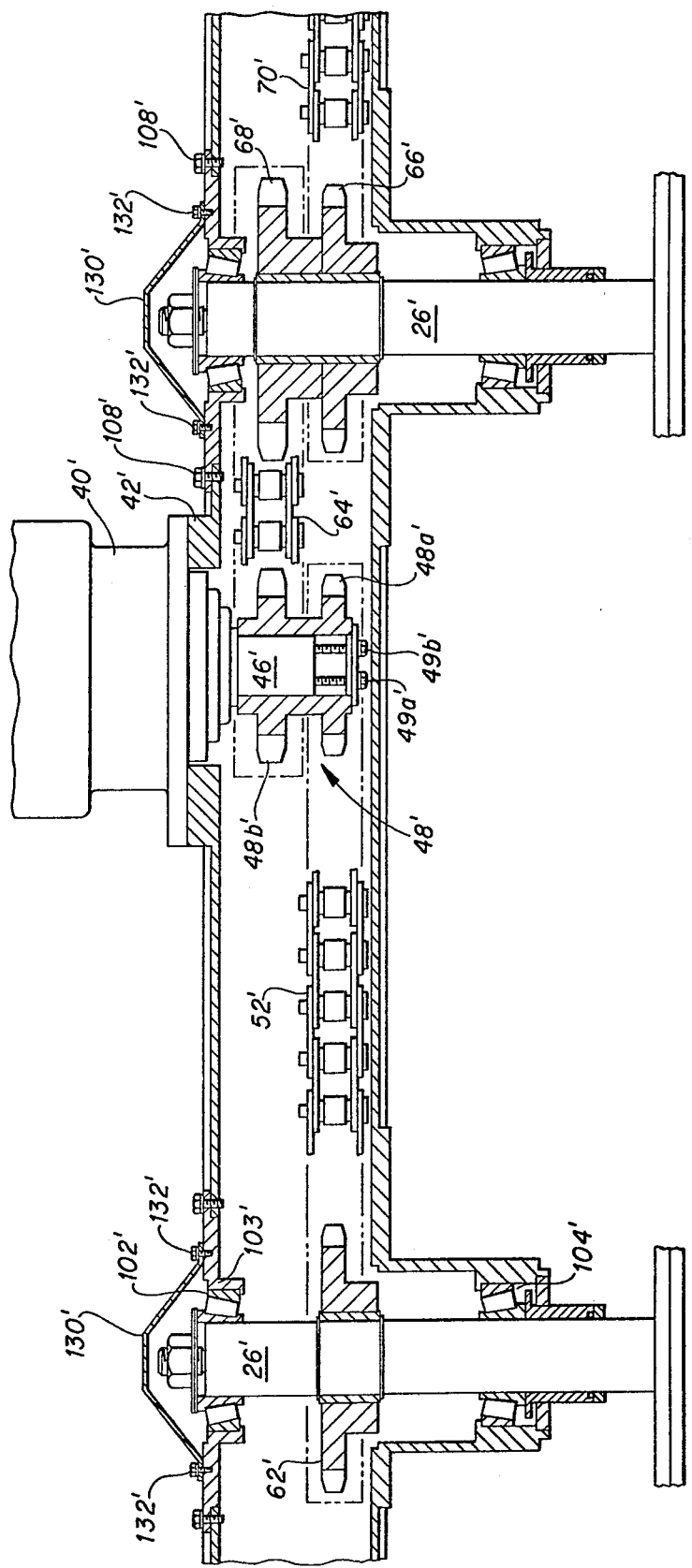
FIG. 19 is an enlarged horizontal sectional view of the carriage of FIG. 1 having an alternative drive system.

Turning now to FIG. 19, there is shown in detail a modified drive system for undercarriage 10. Whereas the drive system 28 shown in FIG. 2 and further shown in detail in FIGS. 3a and 3b has a speed reducer 40 attached to a frame extension 42 such that motor 30 is located outboard of frame 12, the modified drive system of FIG. 19 is arranged such that a motor and speed reducer 40' are disposed inboard of frame 12. Speed reducer 40' is mounted on frame extension 42' which extends upwardly from the inside rearward top surface of frame 12.

Speed reducer 40' has an output shaft 46' to which a drive sprocket 48' having two sets of teeth 48a' and 48b' is attached by means of bolts 49a' and 49b'. Chain 52' connects sprocket 48a' to sprocket 62' attached to axle 26' of rear wheel 24. Accordingly, sprocket 62' rotates in unison with sprocket 48'.

It will be noted that axle 26' of rear wheel 24 is rotatably supported by an inner bearing assembly 102' and an outer bearing assembly 104'. A protective cover 130' is provided to protect the inward end of axle 26' of rear wheel 24. Cover 130' is secured to bearing holder 103' by screws 132'. Accordingly, the inward end of axle 26' is shielded in the drive system arrangement of FIG. 19.

A chain 64' connects sprocket 48' to sprocket 68' and provides a driving connection between speed reducer 40' and axle 26' of middle wheel 22. Located substantially adjacent to sprocket 68' and also connected to axle 26' of middle wheel 22 is sprocket 66'. A chain 70' is constrained for rotation around sprocket 66' for driving axle 26 of the forward wheel 20.

In accordance with the drive system of FIG. 19, axles 26' of the rear wheel 24 and the middle wheel 22 are each driven directly from the speed reducer. Such an arrangement reduces the amount of chain required by the arrangement of FIGS. 3a and 3b.

Although tension adjustment assemblies shown in FIGS. 3a and 3b have not been shown in FIG. 19, it is to be understood that such mechanisms could be utilized with the drive system of FIG. 19. Also, although the brake mechanism shown in FIG. 3b for axle 26 of middle wheel 22 is not shown in FIG. 19, it is to be further understood that such brake mechanism could be utilized with the drive system shown in FIG. 19.

In reference now to FIGS. 20–24, there is shown several additional vehicles to which the undercarriage of the present invention can be adapted.

Figure 20:
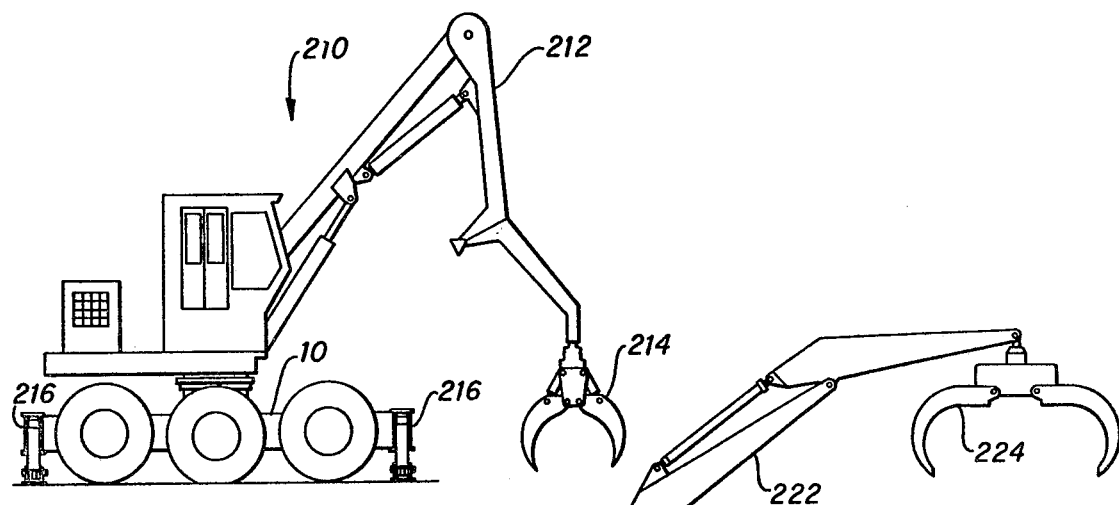
FIG. 20 is an illustration of the application of the invention to a power loader.

FIG. 20 illustrates the application of the undercarriage 10 to a hydraulic power loader 210. The power loader vehicle utilizes a three wheeled version of undercarriage 10. Power loader 210 comprises a hydraulically actuated, articulated arm 212 having hydraulically actuated claws 214 mounted on the end thereof. The undercarriage of power loader 210 is further provided with hydraulic stabilizers 216 at the front and rear ends.

Figure 21:
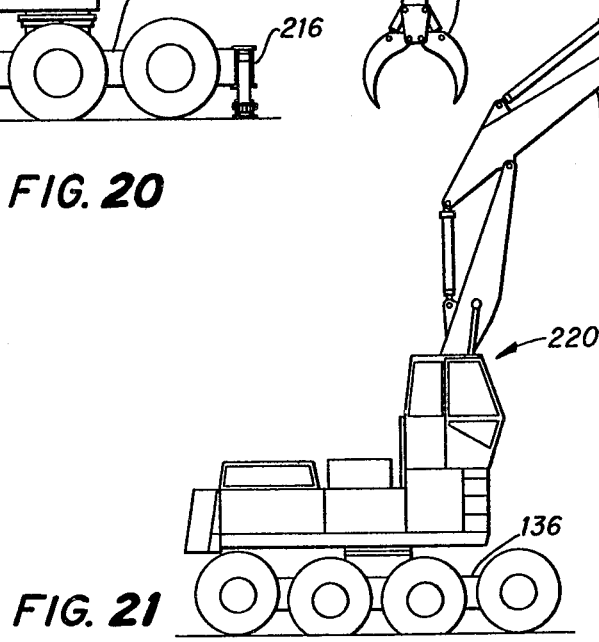
FIG. 21 is an illustration of the application of the invention to a power loader of heavier duty than that of FIG. 20.

Shown in FIG. 21 is a hydraulic power loader 220 supported on a four wheeled version of undercarriage 136. The configuration of power loader 220 is substantially identical to loader 210 of FIG. 20, except the undercarriage has been replaced by the more heavy duty undercarriage. Hydraulic loaders 220 also comprises a hydraulically operated, articulated arm 222 having a set of hydraulically actuated scrap grabbers 224 mounted on the end thereof.

Figure 22:
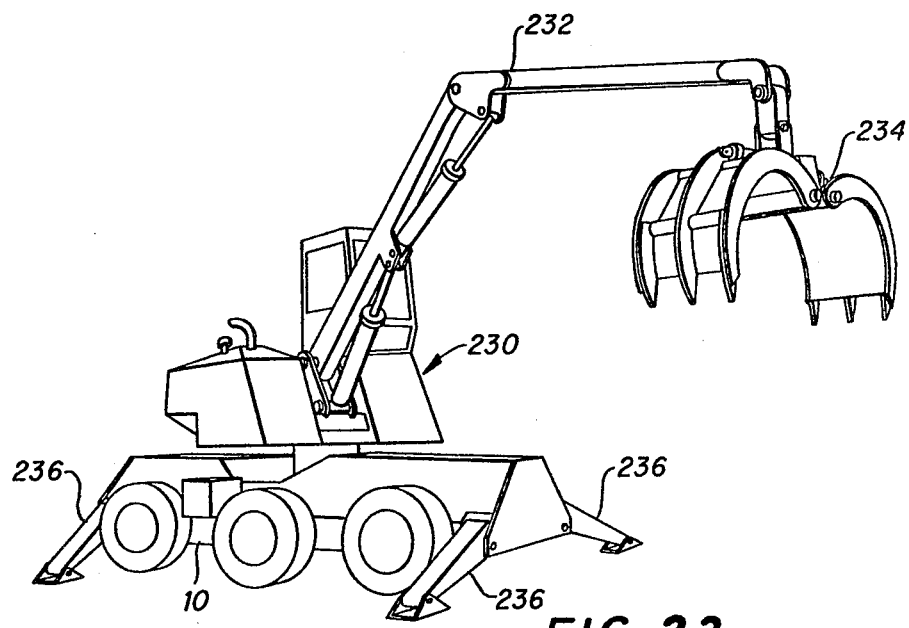
FIG. 22 is an illustration of the application of the invention to a power loader having a knuckle boom crane.

Another power loader 230 is shown in FIG. 22 supported on undercarriage 10. Power loader 230 is provided with a knuckle boom crane 232 comprising an articulated arm with a hydraulically operated hand 234 on the end. As shown, loader 230 incorporates stabilizers 236 at the front and rear.

Figure 23:
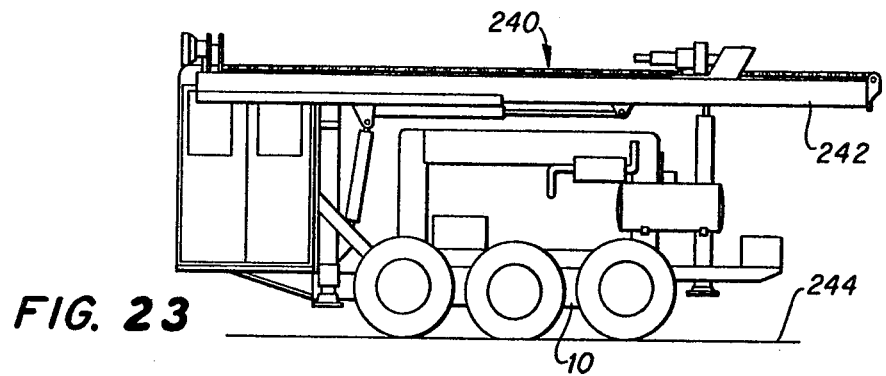
FIGS. 23 and 24 are illustrations of the application of the invention to a rotary drilling rig vehicle.
Figure 24:
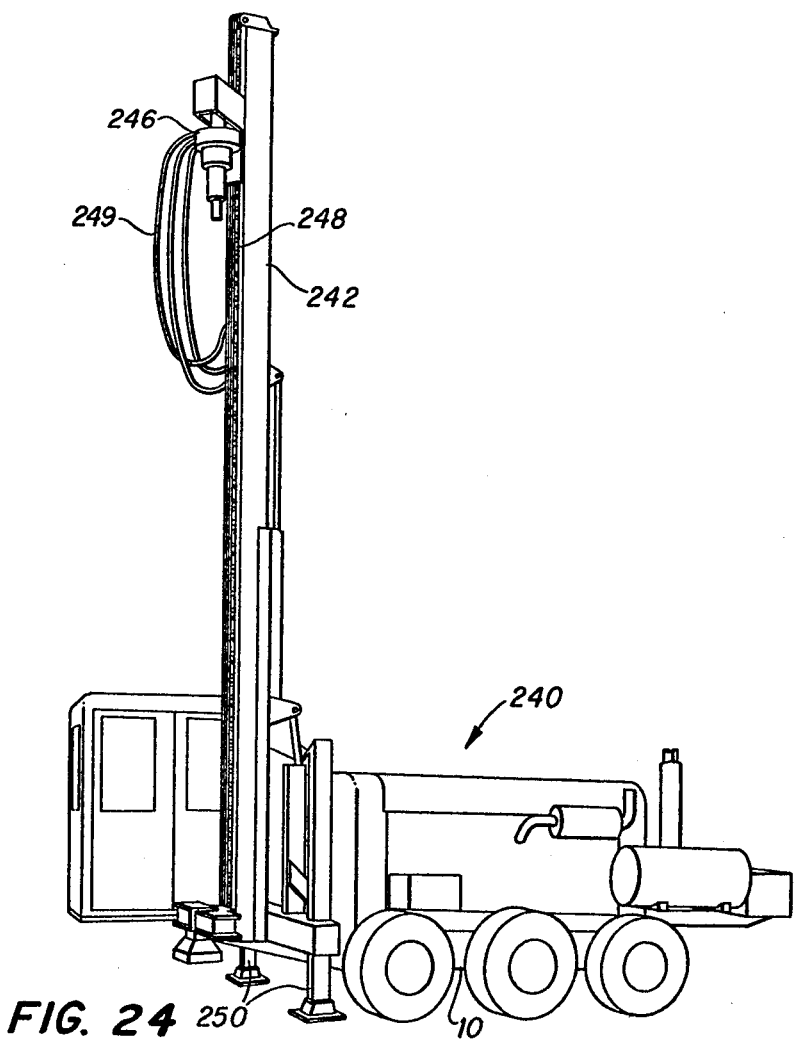

FIGS. 23 and 24 show undercarriage 10 as applied to a mobile rotary drilling vehicle 240. During transportation, the drilling mast 242 is carried in a down position, wherein the mast is substantially parallel to the road surface 244 over which the vehicle travels.

As shown in FIG. 24, the drilling mast 242 when raised into the vehicle drilling position is disposed at one end of vehicle 240. The rotary drilling head 246 is raised and lowered by a chain 248. Rotation of drilling head 246 is through the application of controlled hydraulic pressure in lines 249. Vehicle 240 is stabilized in the drilling position by stabilizers 250 mounted at the front and rear of the vehicle.

Figure 25:
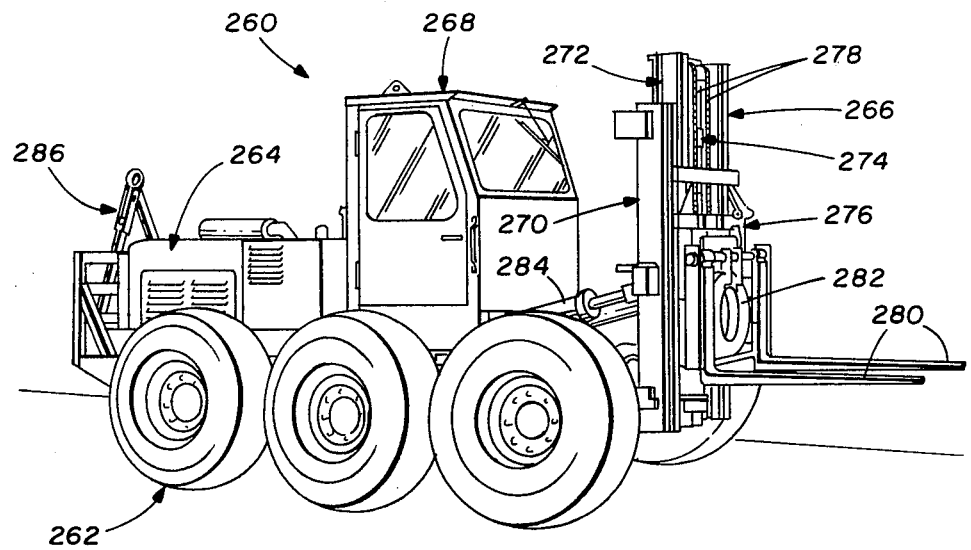
FIGS. 25 and 26 are illustrations of the application of the invention to a rough terrain fork lift truck.
Figure 26:
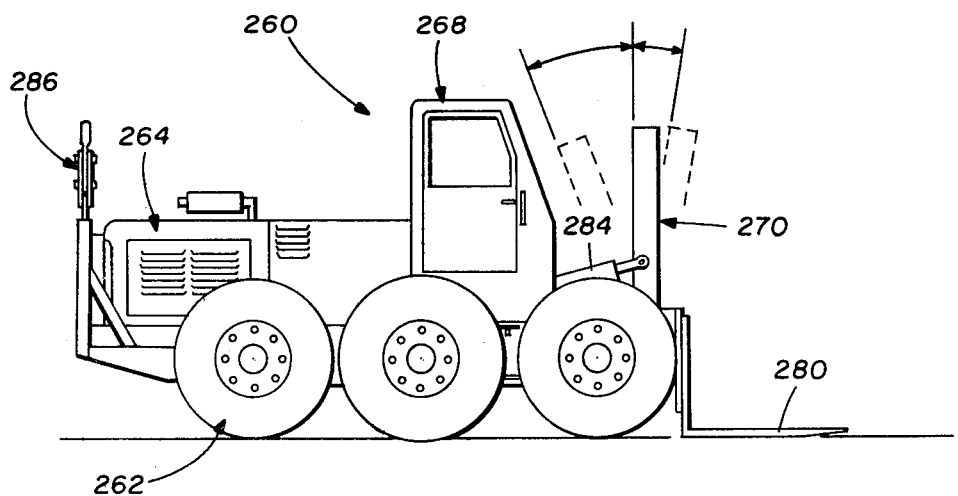

Referring now to FIGS. 25 and 26, there is shown a rough terrain fork lift truck 260 incorporating the invention. The rough terrain fork lift truck 260 comprises a pair of undercarriage assemblies 262 each substantially identical to the undercarriage assembly illustrated in and described hereinabove in conjunction with FIGS. 15 and 16. In addition, each undercarriage assembly 262 may be provided with one or more brakes of the type illustrated in and described hereinabove in conjunction with FIGS. 1 and 2. That is, the undercarriage assemblies 262 may include one or more brakes each having one or more fixedly mounted braking elements positioned for cooperation with one or more braking elements mounted on an axle of the undercarriage assembly. Such braking mechanisms may include both service brakes and parking brakes in accordance with particular requirements.

The rough terrain fork lift truck 260 includes structured members interconnecting the undercarriage assemblies 262. An engine 264 mounted at the rear end of the truck 260, and a fork lift mechanism 266 is mounted at the front end thereof. A cab 268 is mounted between the engine 264 and the fork lift mechanism 266. The cab 268 includes all of the instrumentalities necessary for operating the rough terrain fork lift truck 260.

The fork lift mechanism 266 includes a mast 270 which is nominally vertically oriented. The mast 270 includes an extendable portion 272 which may be raised and lowered under the action of one or more hydraulic cylinders 274. A travelling mechanism 276 is supported on the mast 270 for vertical movement under the action of chains 278. A pair of forks 280 are supported on the travelling mechanism 276 for vertical movement therewith. A mechanism 282 comprising part of the travelling mechanism 276 supports the forks 280 for pivotal movement about a horizontal axis.

As is perhaps best shown in FIG. 26, the rough terrain fork lift truck 260 includes a pair of hydraulic cylinders 284. By means of the hydraulic cylinders 284 the mast 270 and therefore the entire fork lift mechanism 266 is adapted for pivotal movement through an arc of approximately 30°. Assuming that the mast 270 is normally vertically disposed, the cylinders 284 are adapted to pivot the mast approximately 20° rearwardly and approximately 10° forwardly. Rearward pivotal movement of the mast facilitates support and transport of whatever load may be carried by the forks 280, and forward pivotal movement of the mast adapts the fork lift mechanism 266 to receive and discharge loads from the forks 280.

The rough terrain lift truck 260 has two basic operating modes, including a hard surface operating mode and a rough terrain operating mode. When the rough terrain lift truck 260 is operated on a hard surface and under circumstances in which the forks 280 are either unloaded or are carrying a relatively insignificant load, the truck 260 is supported by and driven by the center pair of wheels and the rearward pair of wheels comprising the undercarriage assemblies 262. Conversely, when the forks 280 are heavily loaded, the rough terrain fork lift truck 260 is supported by and driven by the center pair of wheels and the forward pair of wheels comprising the undercarriage assemblies 262. When operating in rough terrain, the fork lift truck 260 may be carried by various combinations of wheels up to and including all six wheels comprising the undercarriage assemblies 262 depending on the specific nature of the terrain being traversed.

An additional feature of the rough terrain fork lift truck 260 comprises a tow bar 286 which may be secured to the truck 260 adjacent the engine 264, if desired. By means of the tow bar 286, the rough terrain fork lift truck 260 may be used as a towing vehicle in addition to its primary use as a fork lift vehicle. It will be understood that other apparatus adapting the rough terrain fork lift 260 for connection to a towed vehicle may be utilized in lieu of the tow bar 286, if desired.

Although specific embodiments of the invention have been illustrated in the accompanying Drawings and described in the foregoing Detailed Description, it will be understood that the invention is not limited to the embodiments disclosed, but is adapted to various modifications, rearrangements and variations of the parts and elements described without departing from the spirit of the invention.

We claim:

1. A rough terrain fork lift truck comprising:
(a) a pair of undercarriage assemblies, each including:
an elongate hollow load-bearing frame;
at least three axle members each having a wheel receiving member at one end thereof;
at least three wheel members each mounted on and secured to a wheel receiving member of an axle member outside said frame;
means rotatably supporting the axle members at longitudinally spaced points along the frame with each of the axle members extending out of the frame and being rotatably supported in at least one side of the frame;
the middle wheel member extending below a plane lying tangent to the bottoms of the end most wheel members to facilitate skid steering of the rough terrain fork lift truck;
transmission means including sprockets and chains positoned within the frame and drivingly interconnecting at least two of the axle members; and
drive means including a motor mounted on the frame and operably connected to the transmission means for actuation thereof whereby the drive means and the transmission means cause concurrent rotation of the interconnected axle members;
(b) an engine supported on the undercarriage assemblies at the rear end thereof;
(c) a fork lift mechanism mounted on the undercarriage assemblies at the front end thereof, the fork lift mechanism including:
a normally vertically disposed mast;
a travelling mechanism supported for vertical movement relative to the mast;
means for selectively raising and lowering the travelling mechanism on the mast;
at least one fork member mounted on the travelling mechanism for vertical movement therewith relative to the mast; and
means for selectively pivoting the mast about a horizontal axis extending parallel to the axle members comprising the undercarriage assemblies.

2. A rough terrain fork lift truck, comprising:
(a) a pair of undercarriage assemblies, each including:
an elongate hollow load-bearing frame;
at least three axles;
at least three wheels each mounted on and secured to one end of an axle outside said frame;
means rotatably supporting the axles at longitudinally spaced points along the frame with each of the axles extending out of the frame and being rotatably supported in at least one side of the frame;
the middle wheel extending below a plane lying tangent to the bottoms of the endmost wheels to facilitate skid steering of the rough terrain fork lift truck;
transmission means positioned within the frame for drivingly interconnecting at least two of the axles; and
drive means operably connected to the transmission means for actuation thereof whereby the drive means and the transmission means cause concurrent rotation of the interconnected axles;
(b) an engine supported on the undercarriage assemblies at the rear end thereof;
(c) a fork lift mechanism mounted on the undercarriage assemblies at the front end thereof, said fork lift mechanism including:
a normally vertically disposed mast;
a travelling mechanism supported for vertical movement relative to the mast;
means for selectively raising and lowering the travelling mechanism on the mast;
at least one fork member mounted on the travelling mechanism for vertical movement therewith relative to the mast; and
means for selectively pivoting the mast about a horizontal axis extending parallel to the axles comprising the undercarriage assemblies.

3. The fork lift truck of claim 2, wherein the elongate hollow frame of each undercarriage assembly is rectangular in cross section and comprised of structural members around its entire periphery and along its entire length.

4. The fork lift truck of claim 2, wherein the middle axle of each undercarriage assembly is rotatable about an axis positioned substantially below a plane extending through the rotational axes of the endmost axles, and wherein all of the wheels are of substantially identical diametric size.

5. The fork lift truck of claim 2, wherein the middle axle of each undercarriage assembly is rotatable about an axis lying within a plane extending through the rotational axes of the endmost axles, and wherein the middle wheel is of substantially larger diametric size than the endmost wheels.

6. The fork lift truck of claim 2, wherein the transmission means of each undercarriage assembly comprises:

a plurality of sprockets each mounted on one of said axles;

a drive sprocket connected to said drive means; and a plurality of chains constrained about said sprockets and said drive sprocket.

7. The fork lift truck of claim 2, wherein the drive means of each undercarriage assembly comprises:

a speed reducer with an output shaft operably connected to said transmission means;

a motor driven by said engine and coupled to said speed reducer; and a brake operably connected to said speed reducer.

* * * * *